United States Patent [19]

Khait

[11] Patent Number: 5,034,760
[45] Date of Patent: Jul. 23, 1991

[54] AUTOMATIC PHOTOGRAPHIC LABELING DEVICE EMPLOYING LCD AND CASSETTE MOUNT

[76] Inventor: George Khait, 612 Westline Dr., Alameda, Calif. 94501-5651

[21] Appl. No.: 457,105

[22] Filed: Dec. 26, 1989

[51] Int. Cl.$^5$ ............................................. G03B 17/24
[52] U.S. Cl. .................................................... 354/105
[58] Field of Search ............... 354/105, 106, 107, 108, 354/109; 378/165

[56] References Cited

U.S. PATENT DOCUMENTS

| | | | |
|---|---|---|---|
| 4,182,559 | 1/1980 | Driscoll et al. | 354/105 |
| 4,361,388 | 11/1982 | Mlcak et al. | 354/106 |
| 4,402,588 | 9/1983 | Khait et al. | 354/106 |

Primary Examiner—L. T. Hix
Assistant Examiner—Howard B. Blankenship
Attorney, Agent, or Firm—David Pressman

[57] ABSTRACT

A photographic cassette with an automatic photographic labeling device comprises an LCD panel (12) and a power supply unit (14) connected to the body of cassette (18). The LCD panel consists of unit display cells (26) arranged in a checkerboard pattern and connected in parallel to the power supply unit, so that any portion of the displaay panel can be removed without damaging the electric connection between the power supply unit and the remaining display cells (26). The cassette with the panel attached is installed into a photographic camera as with a conventional cassette. Since the remaining display cells are constantly connected to power supply unit, which in turn is connected to a crystal timing element (22), the display elements constantly display time indicia, i.e., the year, month, day, etc. When a picture is taken, the non-transparent time delay indicia are projected onto the film and are produced after development. An embodiment of an instant-type camera is characterized by using the batteries, which are available in the cassette for such cameras for driving the film operating mechanism, and which are used here for driving the timing mechanism of the unit. Since the unit is sealed and is provided with unit identification data, it can be used as legal proof of the time when the picture was taken.

20 Claims, 3 Drawing Sheets

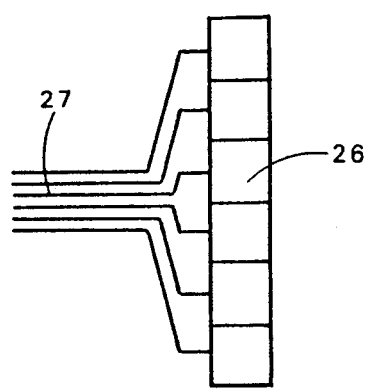
FIG. 4
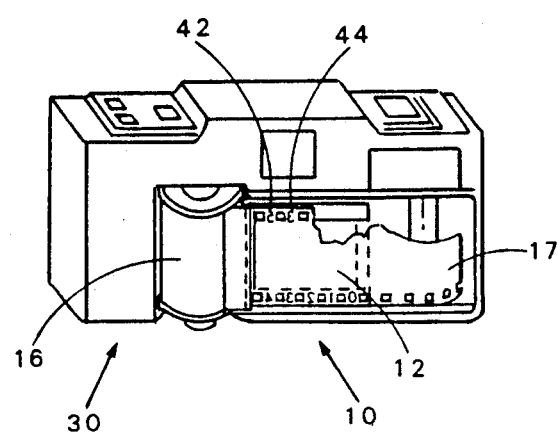
FIG. 5
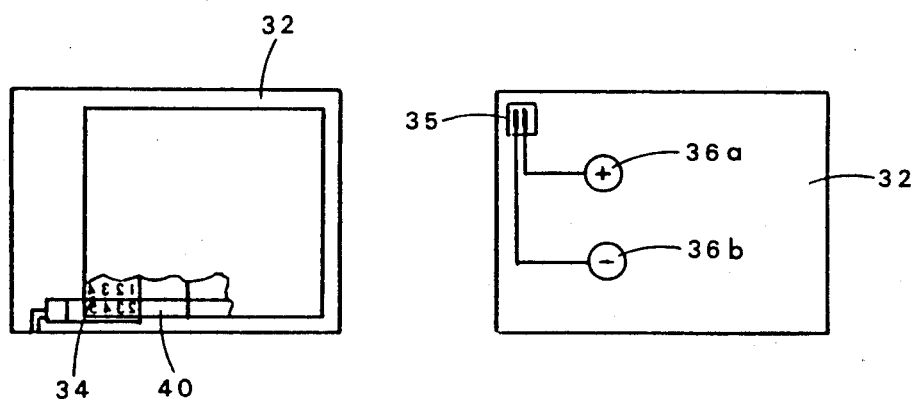
FIG. 6
FIG. 8
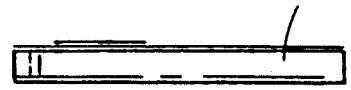
FIG. 7

AUTOMATIC PHOTOGRAPHIC LABELING DEVICE EMPLOYING LCD AND CASSETTE MOUNT

BACKGROUND—FIELD OF THE INVENTION

This invention relates to photography, particularly to a device for automatically labeling a picture with the time it was taken.

BACKGROUND—DESCRIPTION OF THE PRIOR ART

Heretofore, labelers have been provided for automatically adding characters to a photograph to indicate the time the photo was taken, i.e., the date, and sometimes the time of day. One such labeler is described in U.S. Pat. No. 4,402,588 (1983) to G. Khait (the present inventor) and W. Fish. As shown in FIG. 1 of this patent, this labeler comprises a camera 10 with a passive display unit, such as a liquid crystal (LC) display panel 26, positioned in front of a film 24 in the path of the light which is directed at the film from the lens and shutter assembly 12. The display is driven by a clock or other control circuit 26 which is permanently installed in the camera and is attached to the inner surface of its housing. The clock driver is controlled through pushbuttons 30 on the outside of the camera. This labeler can also be retrofitted to most cameras. For this purpose, the labeler is equipped with a special frame and spring assembly (FIG. 6 of '588 patent), which can be positioned inside the back of the camera and which can support the display panel in front of the film. Each time a picture is taken, the indicia on the display panel are projected onto the film and will appear, together with the photographed image, after development of the film.

Although this labeler operates satisfactorily, I have found that it has several areas where improvement can be made. Specifically, the display panel usually is permanently built into the camera by attachment to the inner surface of its housing. Thus removal (e.g., for repair or cleaning) is inconvenient and requires substantial time. Even if it is retrofitted within an existing camera, removal can still be difficult. Also, since the display is not absolutely transparent, it blocks a part of the incident light falling onto the film. This is undesirable, especially when the photographer wishes to switch the labeler off to obtain a full-area picture without reproduction of the date and time information on the film. I.e., the permanent presence of the liquid crystal display panel in the path of light to the film may create a shadow on the photograph. Another disadvantage is that it can label only a predetermined part of the picture, e.g., the left corner, the right corner, etc.

In addition, when the labeler is retrofitted to a camera, one must use a special mounting device which is expensive to manufacture and which must be specially designed for each particular model camera to which it is to be retrofitted. Also, most cameras have a relatively small available space for incorporation of any additional devices. The same disadvantages apply to instant-developing cameras, such as those sold under the trademark Polaroid. In addition, the labeler does not allow one to take advantage of the film-advance motor-powering batteries already built into instant cameras.

Finally, since this prior-art labeler can be reset at any time for any desired date and time, the time indicia on photographs made therewith cannot be used as proof for legal purposes.

OBJECTS AND ADVANTAGES

Accordingly, several objects of the present invention to provide a photographic automatic picture labeling device which is disposable, which is not permanently attached to the camera, which can be selectively installed or removed, which can be sealed and thus cannot be reset without damaging the unit, thereby to provide photographs which can be used as legal proof as to when the picture was taken, which can be used to label any part of the picture, and which can be advantageously used in instant, as well as conventional cameras. Other objects and features of the invention will be better understood after consideration of the drawings, description and claims.

DRAWING FIGS

FIG. 4 shows electrical connections to the labeler's display.

FIG. 5 is a perspective view of the labeler installed in a camera.

FIGS. 6 to 8 are front, top, and rear views of an instant-camera cassette with a labeler of the invention.

REFERENCE NUMERALS

Figure 1:
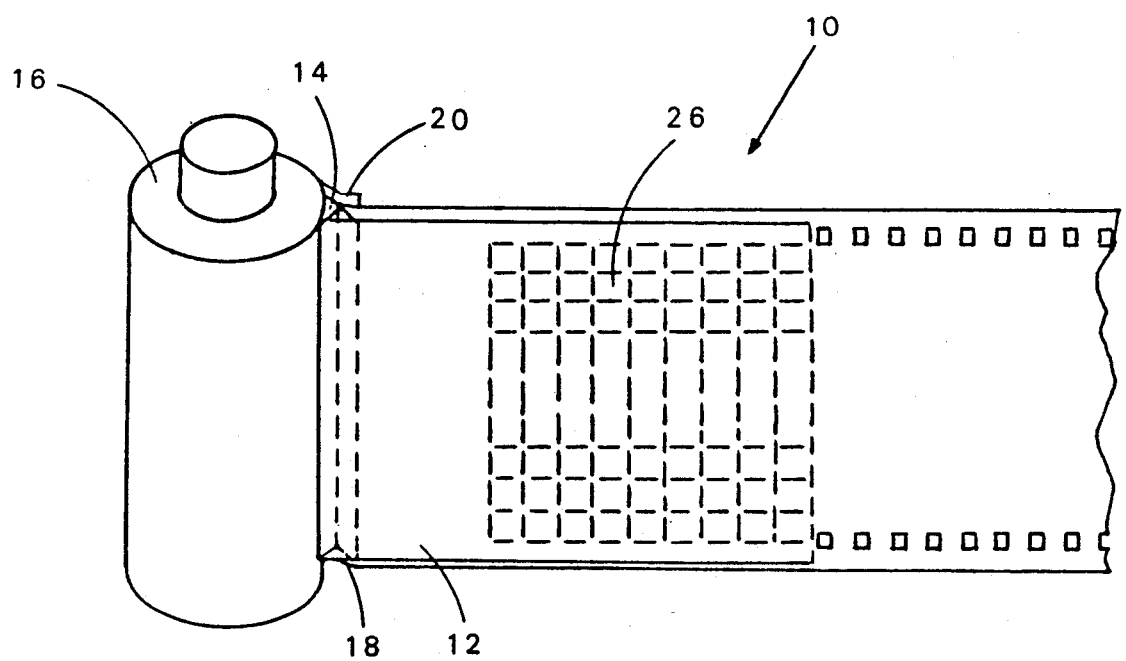
FIG. 1 is a general perspective view of a film cassette with an automatic time labeler according to the invention.

10—labeler
12—liquid crystal panel
14—control unit
16—roll film cassette
17—film in cassette 16
18—groove in cassette
20—guide lip
22—crystal timing element
24—IC
25—energy cell
26—unit display cells
27—leads
28—identification code or sign
30—camera
32—instant-camera cassette
34—photograph labeling device
35—cassette battery
36a, 36b—battery contacts
38—security circuit
40—factory code setting terminals
42—time setting terminals
44—time setting computer
46—IC or chip
48—crystal
50—energy cell
52—display
56—setting push button
A, B—rows of characters

FIGS. 1-5—Labeler With 35mm Roll-Type Film Cassette

FIGS. 1 to 5 show one embodiment of an automatic picture labeler according to the invention. In this embodiment labeler is used with a conventional 35 mm roll-type film cassette 16, which is shown with its film 17 pulled out.

The labeler comprises a liquid crystal display (LCD) panel 12 and a control unit 14. Unit 14 is elongated and has a triangular cross section with two adhesive surfaces so that it can be attached to the usual elongated groove or recess 18 in cassette 16 adjacent its film exit guide lip 20. When so attached, panel 12 extends out, adjacent and in front of a portion of film 17. For convenience of use, transportation, and storage, the adhesive surfaces of unit 14 can be protected by a peel-off release paper which can be removed before attachment.

Figure 2:
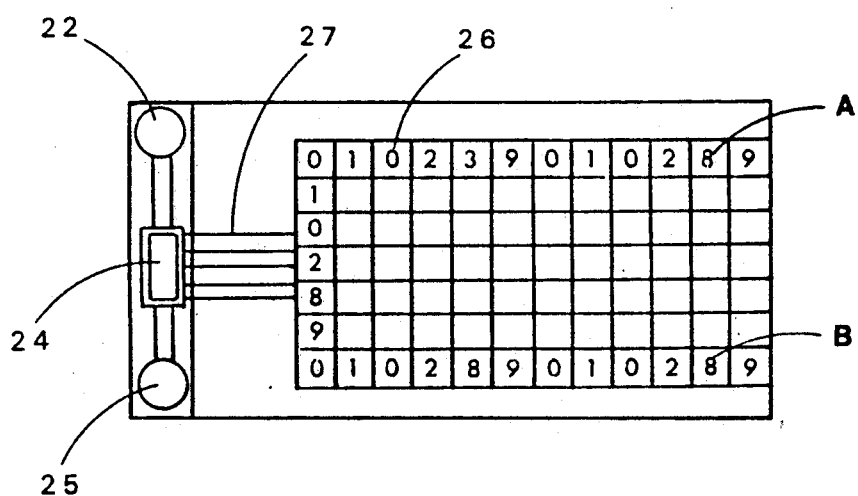
FIGS. 2 and 3 are front and top views of the labeler of FIG. 1.

FIG. 2 shows a front view of the labeler and the internal structure of unit 14. The labeler contains a crystal timing element 22, an integrated circuit (IC) chip 24, and an energy cell 25. Chip 24 has leads (preferably of the printed circuit type) which are connected to various display cells 26 in panel 12.

Figure 3:
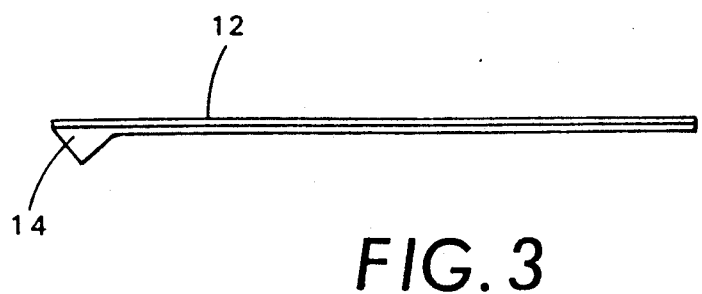

FIG. 3 shows a top view of the labeler showing the triangular crosssectional configuration of unit 14. Note that LC display 12 extends from unit 14 and is flat and thin.

Cell 25 supplies operating voltage in the range of 1 to 6 volts, depending upon the requirements of IC 24. IC 24 uses crystal 22 to form a tuned circuit oscillator to establishes a clock signal for use as a time base. This tuned circuit must have sufficiently high accuracy to maintain the time to within the desired accuracy from the initial time of setting until the last time of use. A typical operating frequency for this oscillator is 32 kHz. Higher frequencies will increase accuracy, but will shorten battery life. The integrated circuit uses the clock signal to drive a series of digital divider circuits (not shown, but well known) to establish a 1 Hz signal. This signal is then further divided to provide signals representing minutes, hours, days, months, and years. Higher level digital logic (again not shown, but well known) is provided to adjust the number of days in each month according to the current month and year.

Panel 12 is made from two transparent layers of material, such as plastic, glass, etc. Display cells 26 are sealed between these layers; the cells are arranged in a rectangular grid. There are no special limitations with regard to the number and dimensions of cells 26, but for clear reproducibility of the indicia transferred to the picture in the case of 35 mm film, the characters in cells 26 should be large enough to be viewable after enlargement, taking into account the resolution capacity of the optics and film.

Since cells 26 are connected to chip 24, the characters displayed by the cells will be continuously varied so that they will always show the current time and date. For this purpose, the uppermost and lowermost rows A and B of cells 26 contain characters which are oriented horizontally. In FIG. 2, row A contains twelve blocks which shows the indicia "010289010289", respectively, indicating the date "1 Feb. 1989" twice, once in the upper left side of the display and once in the upper right. Similarly row B contains the same indicia to indicate the date in the lower left and the lower right positions. The first six blocks down in the first column contain a similar indication so that the date can be provided down the left side of the display. In addition to blocks which show the year, month, and day, additional blocks can be provided (not shown) to indicate the hour, minutes, and even seconds. The space between rows A and B is occupied by cells with characters arranged vertically and carrying the same information. In addition to the cell pattern shown in FIG. 2, many other patterns are possible.

Figure 10:
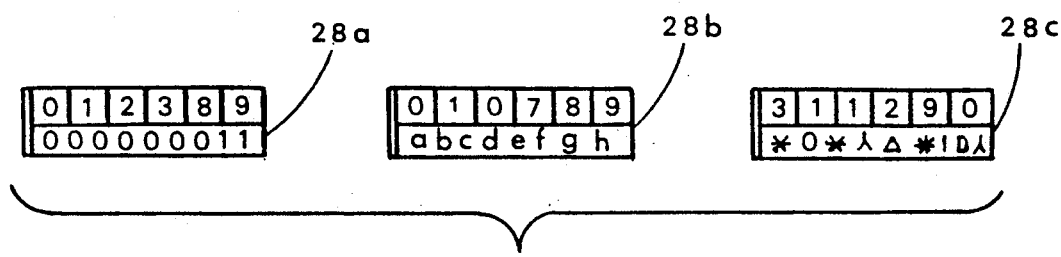
FIG. 10 is a diagrammatic view showing a portion of the display of the labeler with both date and unique unit identifying indicia.

For legal proof of the time when the picture was taken, each group of time indicia (year, month, etc.) may be associated with a special coded number or other symbol to identify the specific labeler which has been installed into the camera. This coded symbol cannot be changed and will be permanently displayed. It will thus constitute proof that the picture was taken with this particular unit, rather than with a resettable unit of the type described in the aforementioned patent. FIG. 10 shows three types of code symbols, 28a, 28b, and 28c (showing binary numbers, letters, and other symbols, respectively). Each group of code symbols is positioned below the time indicia and is permanently formed, e.g., by etching in the display panel, so that it cannot be changed. Symbols other than as shown and in positions other than as shown may of course be provided.

FIG. 4 shows the electrical connections to cells 26. Each cell has parallel connections from chip 24, so that disconnection of one or several elements from the right to the left side on a view of FIG. 2 or 4 does not affect operation of the remaining cells. This allows the user to cut out cells in an arbitrary order from one side to another, in this case from right to left, so as to leave the indicia in any required place of the picture. For example, the indicia can be placed in the upper right corner or the lower left corner of the picture. Since each panel 12 is inexpensive to make in a mass production operation, it can be manufactured as a disposable unit which can be thrown away after use of the film. But, if necessary, the unit can be disconnected after use and attached to another cassette. For this purpose, the adhesive surface can be restored by using adhesive tape with two sticky sides.

FIG. 5 is a general perspective view of labeler 10 installed on film cassette 16 in a camera 30. The labeler does not, interfere with either the movement of the film, or with operation of the camera mechanisms. This is because panel 12 is extremely thin, having a thickness of about 0.5 mm.

DESCRIPTION OF LC DISPLAY

The LC display may have either of several different known forms.

As stated, LCDs are fabricated as a sandwich of two outer pieces of transparent material which have the required transparent conductor patterns (electrodes) used to form the segments or pixels of the desired image. Between these is the LC material which reacts to electrical fields applied across the conductors by twisting its crystal structure so as to alter the polarization of light which passes through it.

Because in general this material reacts slowly to the field, usually the effective voltage across the pixel or segment is the Root Mean Squared (RMS) value of whatever signals are applied. This fact, in conjunction with the fact that a certain minimum threshold value must be exceeded to cause the polarization to be altered, allows the pixels or segments of the display to be multiplexed. Thus it can be made with far fewer electrodes, and thus less electronic circuitry, than is required to drive non-LC electrodes. Accordingly one half of the required actuation voltage may be applied across a pixel or segment without actuating it. Then when the other half of the actuation voltage is selectively applied to the front side electrodes of those pixels or segments which are currently being refreshed in the scanning sequence, only that character will activate. This allows one driver circuit to be connected to the same front side pixel or segment in all of the character positions. Thus a ten-digit, seven-segment numerical display requires only seventeen (ten back plus seven front) driver circuits, rather than seventy.

This labeler can use as few as four digits (for year and month) or as many as 30 digits (year, month, day, hour, minute, second, and serial number). These can be arranged in any number of physical patterns on the display. One possible arrangement is the pattern "YY/MM/DD HH:MM:SS SNXXX" where "YY" represents the last two digits of the year (e.g., "89"), "MM" represents the two digits of the month (e.g., "04"), "DD" represents the date (e.g., "07"), "HH" represents the two digits of the hour in military or European time (e.g., "22" or "09"), "MM" represents the two digits of the minute (e.g., "08"), "SS" represents the seconds (e.g., "60"), and "SNXXX" represents control characters (e.g., "7B0Z7").

Other possible patterns are
"YY/MM/DD HH:MM:SS"
and
"YY/MM"
"SNXXX"
as shown in FIG. 10.

FIGS. 6-8—DESCRIPTION—LABELER WITH INSTANT-CAMERA CASSETTE

FIGS. 6 to 8 show an instant-picture cassette 32 (such as sold under the trademark Polaroid) equipped with an automatic picture labeler 34 of the same type as labeler of the previous embodiment.

A typical instant-type cassette 32 contains a miniature battery 35 (FIG. 8) with negative and positive contacts 36a and 36b. As is known, this battery is used as a power source for driving the picture discharge mechanism (not shown) of the instant camera (also not shown). Labeler 32 is equipped with contacts (not shown) which mate with respective contacts 36 so that the labeler will be powered by battery 35 of the cassette. The power drawn by the labeler is relatively small so that operation of the camera is not affected. Thus in this embodiment, the device need not contain a separate power source, although one may be provided is in the embodiment of FIGS. 1 to 4.

FIGS. 1-5—OPERATION OF ROLL-TYPE CASSETTE

As stated, cassette 16 (FIGS. 1-5) can be supplied with labeler 12, either already attached to cassette 16 or as a separate item. In the latter case, the automatic labeler is packed into a tight, light-impermeable package and has adhesive tape on its attachment surfaces, normally on the side surfaces of power supply unit 14. The adhesive tape is covered with a peel-off strip.

Prior to installation of cassette 16 in camera 30, the peel-off strip (not shown) is removed from the adhesive tape and device 12 is inserted into space 18 of cassette 16 and pressed in, so that the adhesive tape firmly attaches the unit to the cassette.

The cassette now has an automatic photograph labeling capability. It is installed into camera 30 in the same manner as a conventional cassette. FIG. 5 shows camera 30 with film cassette 16 installed. Labeler 12 is on the front side of film 17 so that it is drawn in hidden (broken) lines. The upper right corner of labeler 12 is shown in solid lines, where as film 17 is shown broken away. The free end of the film is not yet fixed to the take-up reel (not shown). At this stage the user can remove excess display cells 26 by cutting panel 12 from the right to the left. For example, panel 12 can be cut as shown in FIG. 5. Since display cells are connected to terminal block 24 of power supply unit 14 in parallel, cutting of extraneous cells will not affect operation of the remaining cells.

As a result, only those portions of the film area which are blocked by the remaining cells will display date and time indicia.

The free end of the film is then started on the take-up reel in conventional fashion, the cover is closed, and the camera is ready for use.

Since chip 24 is permanently connected to the remaining display cells, these cells are always active to show the current time, i.e., year, month, day, hour, etc.

Chip 24, in conjunction with crystal 22, generates digital signals representing all parts of the time and date; these will be displayed as follows. A Binary Coded Decimal (BCD) representation of each digit of the time and date will be sequentially multiplexed through a seven-segment decoder (or five-by-seven dot matrix or other suitable display element decoder) to the driver circuit for the display. While each digit is so selected, the appropriate digit select line is simultaneously activated to apply voltages above the required threshold for the LCD across those segments (or pixels) of the digit which are required to form the desired digit. A shift register is one way to generate the digit select signals as well as the internal signals used to multiplex the BCD digits from their individual counters. This technology is well-understood and has been in widespread use in the digital watch field for many years.

Thereafter, when a picture is taken, the shadow of the indicia, which are not transparent, will always be projected onto the film in the area of superimposed unit display cells 26. After development of the film, these data will appear on the print or slide.

In general, the labeler is disposable, but if necessary, it can be reused as long as the battery is alive (3-5 years).

FIG. 9—SETTING AND SECURITY

Optionally additional contacts (not shown) can be provided on IC 24 to allow the user to set the time and date by external automated circuitry. While existing watch technology utilizes buttons connected to contacts on the watch to set the time and date, the user must press the buttons while reading the display so that such user can interactively set the time and date. This technology clocks the appropriate divider circuits at a higher rate until the user releases the button.

The present system can use a serial data receiver, typically of the asynchronous type, to receive a digital data bit stream which is serially encoded with the date and time. This data is loaded into the counters as each BCD digit is received.

The advantage of this system is that the correct time and date may be set without looking at the display. Thus a computer-based initialization system can be built which will accurately, without interference from the user, set the device. Such a device can be used at the point of manufacture to set the time and date, should it be desired to ship the device in an operating, time-keeping mode. However, since time is different in every time zone, preferably the device is shipped to a distribution point (wholesale or retail) in the market time zone where it will be activated (by connecting the battery), and then the time will be set utilizing the setting device.

Until such setting, the IC will not be activated, i.e., it will not keep time. This will allow a distributor or retailer to activate and set the unit to the local time at the point of sale, thus extending the shelf life of the labeler since it will not consume battery power before being sold. Furthermore, by controlling the setting devices, the accuracy of the time presented by the device can be guaranteed.

Also the security of this arrangement can be further enhanced by (1) utilizing non-standardized data rates and formats, and (2) encrypting the setting codes and including check digits to validate the origin of the data. Any attempt to signal the invention with a false code would result in the establishment of a lengthy lock-out to prevent further attempts to break in.

In order to absolutely guarantee that the time and date represented on a picture have not changed, several measures may be taken. First, at the time of setting, a ten- to twelve-digit serial number may be supplied to the integrated circuit and kept in an internal register. This number consists of two parts, one representing the number of the setting device, and the second being a sequential number from a counter in that setting device. This number can then be displayed on the LCD along with the date and time to validate which unit was used during film exposure. Further, the actual time and date of the most recent setting are kept in another internal register and are available only through electrical inquiry of the IC. Thus by inquiring of the device its last setting time, observing that its displayed time is still accurate (within tolerances), and verifying that the serial number on the film matches that on the LCD, one can establish that the device has not been tampered with since it was set. This requires that the setting devices be tamper-proof and that the setting codes remain secret.

If desired or necessary, additional contacts can be added to the package to allow an external power source to be connected in parallel with the internal source to keep the device operational for a prolonged period of time as required to prove validity of dates recorded with the unit.

Figure 9:
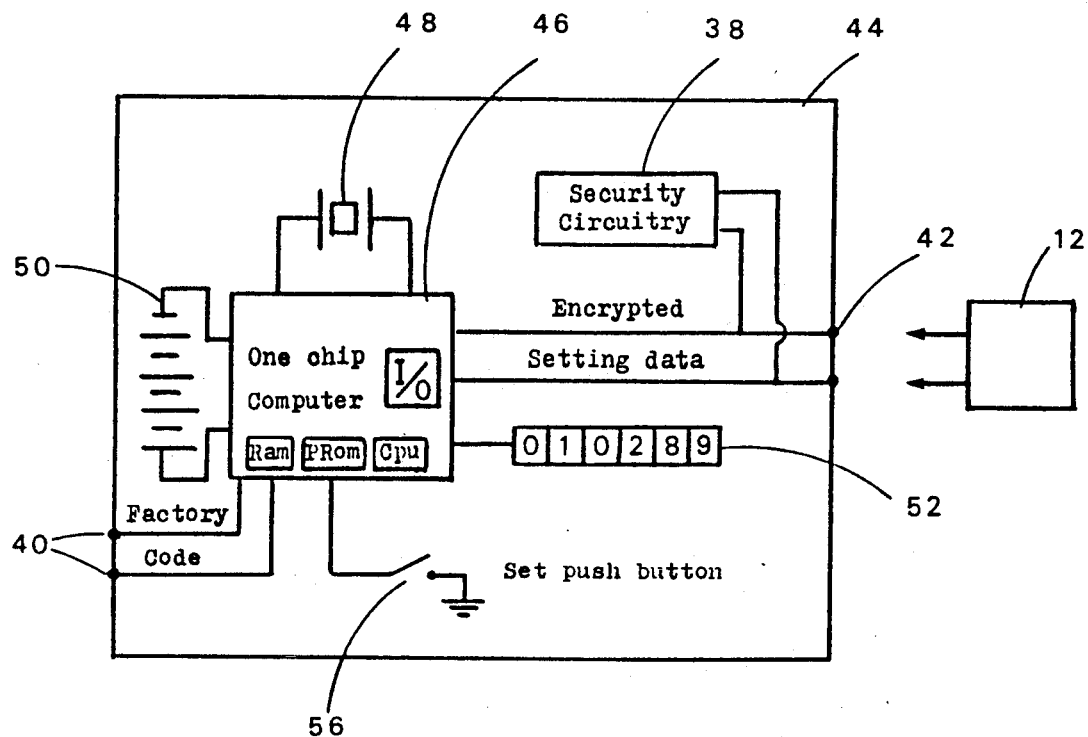
FIG. 9 is a schematic diagram of the labeler.

A suitable system is illustrated in FIG. 9 which shows labeler 12 schematically. A time-setting system 44 contains an IC 46, a crystal 48, and an energy cell 50. IC 46 drives a display 52. As stated, system 44 also contains a security circuit 38 which may be part of chip 46 and which insures that the time on the display, once set at a certification station, cannot be changed unless one knows an encrypted security code. The security code is written into a PROM within IC 44 at the factory via terminals 40. The correct time is entered (in coded form as correlated with the security code) at a certification station: the appropriate encrypted setting data are supplied at terminals 42 to labeler 12. A setting pushbutton 56 transfers the correct time into labeler 12.

FIGS. 6-8—OPERATION ON INSTANT-TYPE CAMERA

In principle, the embodiment of FIGS. 6 to 8 for instant cameras operates in the same manner as the 35 mm version described above, except that timing element 35 is connected by lead wires to positive and negative contacts 36b and 36a, respectively, of the battery of cassette. Therefore the labeler does not have a triangular power supply unit, but is flat and is attached by adhesive tape to cassette 32 so that the activated display cells can appear in any desired area of the picture.

Connection to the cassette battery has been shown only by way of example and, similar to the case of the roll-type cassette, the unit can be self-contained and may have its own battery.

SUMMARY, RAMIFICATIONS, AND SCOPE

I have shown that the automatic photograph labeler of the invention is disposable, can be attached to or supplied with a cassette rather than permanently attached to the camera, can be selectively installed or removed from the cassette, is sealed and cannot be reset without damaging the unit and therefore is suitable as legal proof for data when the picture was taken, can be selectively placed into any part of the picture, and can be advantageously used in instant cameras, as well as conventional roll-type cameras.

Although the device has been shown and described with reference to specific embodiments, it is understood that these specific embodiments, their parts, materials, and configurations have been given only as examples, and that many other modifications are possible. For example, control unit 14 can alternatively be made flat and flexible and pasted to any surface of the cassette. The unit can be attached to cassette means other than the adhesive tape. For example, it can be inserted into a slot and held by friction, it can be permanently adhered, or connected by a multiple-hook-and-loop fastener In addition to use with 35 mm and instant-camera-type film, a labeler can be used with other types of film and cameras, such as disposable cameras, and those using photographic plates, discs, and even magnetic storage of images. In addition to being positioned in front of a useable area of the film, the time indicia can be positioned between the sprocket holes so as not to take up film area. The device need not necessarily be used in photographic cameras, but can be installed in video cameras, copying machines, microscopes, etc. Although the display cells have been shown in a grid-type layout, they can be arranged in any other order, e.g., in a diagonal layout, a circular layout, etc. The LC panel can be attached to any transparent substrate, such as a windshield of a car or a computer monitor screen, and can be used as an independent clock. Although the device has been shown with a power supply unit attached to the outer side of cassette, in mass production this unit can be built into the body of the cassette and disposed together with the cassette after development of the film. The entire unit, including battery, liquid crystal, wiring, logic elements, and display elements can be manufactured in a thin flat-film form. In lieu of an integrated circuit, a control or display-driving circuit made of discrete components can be used. If a labeler is stored (either before or after use) for a longer time than its battery life, the time information, once set, can be preserved until a new battery is installed and the labeler is used, or until the previously-used time setting is authenticated, by connecting an auxiliary power source to its battery terminals to preserve the set time information.

Therefore, the scope of the invention should be determined not by the examples given, but by the appended claims and their legal equivalents.

I claim:

1. An automatic picture labeler for a photographic film cassette which is arranged to be loaded into a camera having a shutter and a lens, comprising:

display means comprising a liquid-crystal transparent panel carrying a plurality of non-transparent, electrically controlled display elements and a drive unit electrically connected to activate said elements such that said elements continuously display predetermined information, said display means comprising means for physically mounting said display means directly on a photographic film cassette comprising a prepackaged, light-impervious container having unexposed photographic film therein, so that (a) when said cassette is outside said camera, said predetermined information on said transparent panel can be read by viewing said cassette, and (b) when said photographic film cassette is loaded into said camera and a portion of said film is drawn from said cassette and positioned in a light-receiving position within said camera and behind said camera's lens and shutter, said transparent panel will be positioned in front of said portion of said film so as to cast a shadow of said display information onto said film when said film is exposed to light from a photographed image entering said camera and passing through said shutter and lens to said portion of said film, whereby said predetermined information can be checked by a user by viewing said cassette without activating any switch and said predetermined information will be active for an extended time.

2. The photographic cassette of claim 1 wherein said cassette contains a roll of 35 millimeter film therein.

3. THe photographic cassette of claim 1 wherein said cassette has a surface with a recess on said surface, said drive unit having a portion shaped for mating with said recess.

4. The photographic cassette of claim 3 wherein said cassette has adhesive on a portion of said surface thereof.

5. The photographic cassette of claim 1 wherein said display means comprises two layers of a transparent medium with said electrically controlled display elements being sealed and sandwiched between said two layers.

6. The photographic cassette of claim 5 wherein said display means has a width substantially equal to the width of said film contained in said cassette and said predetermined information is repeated in a plurality of positions on said panel so that information can be projected onto and photographically reproduced on any portion of said film.

7. The photographic cassette of claim 1 wherein said drive unit comprises a crystal timing element and a control circuit, one side of said control circuit being electrically connected to said crystal element, the other side of said control circuit being connected to said display elements, so that said display elements will be electrically controlled by said crystal timing element and said control circuit.

8. The photographic cassette of claim 7 wherein said display elements have parallel connections to said other side of said control circuit, so that disconnection of any of said display elements does not interrupt operation of any of said display elements.

9. The photographic cassette of claim 1 wherein said display means has a length within the range of 5 to 25 millimeters and a thickness of 0.5 to 0.8 millimeter.

10. The photographic cassette of claim 1 wherein said display elements contain at least one identification sign which identifies a particular picture labeling device used for labeling a film contained in said cassette, said sign being permanent and constantly displayed.

11. A photographic film cassette of the type which is loaded into a camera, said cassette having an automatic picture labeling device, comprising:

a photographic cassette comprising a prepackaged, light-impervious container having a roll of unexposed photographic film therein, and a picture labeling device comprising a transparent display panel carrying electrically controlled display elements which display predetermined information in the form of a liquid-crystal display panel, and a drive unit electrically connected to said elements, said display panel being mounted directly on said photographic cassette in a position such that (a) when said cassette is free and outside said camera, said predetermined information on said display panel can be read by viewing said cassette, and (b) when said cassette is loaded into a camera and a portion of said film is withdrawn from said cassette into a light-receiving position behind a shutter and lens of said camera, said display panel will be positioned in front of said film so as to cast a shadow of said display elements onto said portion of said film when light from a photographed image enters said camera, such that said information will be recorded on said portion of said film, whereby said predetermined information can be checked by a user by viewing said cassette without activating any switch, said predetermined information will be active for an extended time.

12. The photographic cassette of claim 11 wherein said cassette has a surface with a recess thereon, said drive unit having a portion for connection to said cassette and being located in said recess.

13. The photographic cassette of claim 12 wherein said portion of said drive unit has a layer of adhesive thereon for enabling said drive unit to be affixed to said cassette.

14. The photographic cassette of claim 11 wherein said display panel comprises two layers of a transparent medium with said electrically controlled display elements being sealed and sandwiched between said two layers.

15. The photographic cassette of claim 14 wherein said display panel has a width equal to the width of said photographic film contained in said cassette and said predetermined information is repeated in a plurality of positions on said panel so that information can be projected onto and photographically reproduced on any portion of said film.

16. The photographic cassette of claim 11 wherein said drive unit comprises a crystal timing element and a terminal block, one side of said terminal block being electrically connected to said crystal element, the other side of said terminal block being connected to said display elements, so that said display elements are electrically connected to said crystal timing element.

17. The photographic cassette of claim 16 wherein said display elements have parallel connections to said other side of said terminal block, so that disconnection and separation of any of said display elements does not interrupt operation of any other display element.

18. A photographic cassette with self-developing film therein and an automatic picture labeling device comprising:

a flat, instant-type photographic cassette with a battery for driving a film operating mechanism, said battery having negative and positive contacts;

a transparent liquid-crystal display panel carrying fixed and electrically controlled display elements which display predetermined time information and a drive unit electrically connected to activate said electrically controlled display elements, said drive unit having two lead wires connected to said negative and positive contacts, respectively, said display panel being connected to and mounted directly on said photographic cassette, said display panel comprising two layers of a transparent medium with said electrically controlled display elements being sealed between said two layers, said drive unit comprising a crystal timing element and a control circuit, one side of said control circuit being electrically connected to said crystal element, the other side of said control circuit being connected to said display elements, so that said electrically controlled display elements are electronically controlled by said crystal timing element and said control circuit, said fixed display elements containing at least one unique identification sign which identifies said picture labeling device, said sign being permanent and constantly displayed, said liquid-crystal display panel being sealed so that said time information cannot be varied by a user thereof, whereby said predetermined information can be checked by a user by viewing said cassette without activating any switch, said predetermined information will be active for an extended time, and said time information displayed by said electrically controlled display elements will be non-changeable and verifiable from said unique identification sign.

19. An automatic picture labeler for a photographic film cassette of the type which is loaded into a camera having a shutter and a lens, comprising:

display means comprising a unit including a panel carrying a plurality of electrically controlled display elements and an attached drive unit electrically connected to activate said elements, such that said elements continuously display a first plurality of characters which indicate a time quantity, said panel also carrying a second plurality of display characters which are independent of said drive unit and which are permanently and non-changeably displayed, said second plurality of display characters being unique to said unit so as uniquely to identify said display means and thereby constitute identifying characters, said display means comprising means for physically mounting said display means directly on a photographic film cassette of the type comprising a prepackaged, light-impervious container having unexposed photographic film therein, so that (a) when said cassette is outside said camera, said predetermined information on said panel can be read, and (b) when said photographic film cassette is loaded into said camera and a portion of said film is drawn from said cassette and positioned in a light-receiving position within said camera and behind sand camera's lens and shutter, said panel will be positioned in front of said portion of said film so as to cause said first and second plurality of characters to be recorded onto said film when said film is exposed to light from a photographed image entering said camera, whereby said film will record said time information together with said photographed image so that the time said image was taken will be recorded onto said film with said image, and whereby said identifying characters will also be recorded onto said film along with said image and said time information so that said identifying characters will indicate that said time information uniquely came from said display means, whereby the accuracy of said time information can be verified from said unit.

20. The automatic picture labeler of claim 19 wherein said display means includes means for preventing said first plurality of characters from being changed.

* * * * *

UNITED STATES PATENT AND TRADEMARK OFFICE
CERTIFICATE OF CORRECTION

PATENT NO. : 5,034,760
DATED : July 23, 1991
INVENTOR(S) : George Khait

It is certified that error appears in the above-identified patent and that said Letters Patent is hereby corrected as shown below:

Column 8, line 36, after "cassette" insert --by--.

Signed and Sealed this

Thirteenth Day of April, 1993

Attest:

STEPHEN G. KUNIN

Attesting Officer

Acting Commissioner of Patents and Trademarks